(12) United States Patent
Soto et al.

(10) Patent No.: US 10,488,505 B2
(45) Date of Patent: Nov. 26, 2019

(54) POSITIONING IN INDOOR LOCATIONS AND OTHER GPS-DENIED ENVIRONMENTS

(71) Applicant: The Boeing Company, Chicago, IL (US)

(72) Inventors: Ely V. Soto, Fairfax, VA (US); Daniel Weigand, Fairfax, VA (US)

(73) Assignee: The Boeing Company, Chicago ( * ) Notice: Subject to any disclaimer, the term of this patent is extended or adjusted under 35 U.S.C. 154(b) by 1203 days.

(21) Appl. No.: 14/291,109

(22) Filed: May 30, 2014

(65) Prior Publication Data

US 2015/0346333 A1 Dec. 3, 2015

(51) Int. Cl.

| G01S 5/06 | (2006.01) |
|---|---|
| G01S 5/16 | (2006.01) |
| G01S 1/08 | (2006.01) |
| G01S 1/70 | (2006.01) |
| G01C 3/00 | (2006.01) |
| G06F 17/40 | (2006.01) |

(Continued)

(52) U.S. Cl.
CPC ............ G01S 13/08 (2013.01); G01S 5/0257 (2013.01); G01S 5/0273 (2013.01); G01S 5/0278 (2013.01); G01S 5/0294 (2013.01); G01S 13/58 (2013.01); *G01C 3/00* (2013.01); *G01S 1/08* (2013.01); *G01S 1/70* (2013.01); *G01S 5/06* (2013.01); *G01S 5/16* (2013.01); *G06F 17/40* (2013.01); *G06F 19/00* (2013.01)

(58) Field of Classification Search
CPC ........ G01S 13/08; G01S 13/58; G01S 5/0257; G01S 5/0273; G01S 5/0278; G01S 5/0294; G01S 5/06; G01S 5/16; G01S 1/08; G01S 1/70; G01C 3/00; G06F 17/40; G06F 19/00

USPC .... 356/3, 3.01, 3.1, 614, 623; 382/100, 106; 702/1, 127, 150, 187, 189; 708/100, 200
IPC ................... G01C 3/00; G01S 1/00,1/02, 1/08, G01S 1/70, 5/00, 5/02, 5/06, 5/16, 13/08, 13/58, 5/0257, 5/0273, 5/0278, 5/0294; G06F 17/00, 17/40, 19/00
See application file for complete search history.

(56) References Cited

U.S. PATENT DOCUMENTS 5,365,516 A * 11/1994 Jandrell ............... G01S 5/0009
340/991
5,526,357 A * 6/1996 Jandrell ............... G01S 5/0009
340/991

(Continued)

FOREIGN PATENT DOCUMENTS

| WO | 0239063 A1 | 5/2002 |
| WO | 2007101453 A1 | 9/2007 |

OTHER PUBLICATIONS

Form PCT/ISA/206, Invitation to Pay Additional Fees and, Where Applicable, Protest Fee, dated Jul. 7, 2015.

(Continued)

*Primary Examiner* — Mohamed Charioui
*Assistant Examiner* — Catherine T. Rastovski
(74) *Attorney, Agent, or Firm* — McDonnell Boehnen Hulbert & Berghoff LLP

(57) ABSTRACT

Methods for: (1) extracting Doppler/velocity measurements; (2) estimating relative clock bias errors; (3) determining range and velocity estimates with associated confidences; and (4) extracting range estimates using channel estimation are disclosed. These methods can be used separately or combined to improve positioning solutions obtained by positioning systems used in indoor locations and other GPS-denied environments.

18 Claims, 11 Drawing Sheets

(51) Int. Cl.
*G06F 19/00* (2011.01)
*G01S 13/08* (2006.01)
*G01S 13/58* (2006.01)
*G01S 5/02* (2010.01)

(56) References Cited

U.S. PATENT DOCUMENTS

| | | | | |
|---|---|---|---|---|
| 6,047,017 | A * | 4/2000 | Cahn | G01C 21/26 375/134 |
| 6,198,765 | B1 * | 3/2001 | Cahn | G01C 21/26 370/335 |
| 6,249,252 | B1 * | 6/2001 | Dupray | G01S 1/028 342/450 |
| 6,408,246 | B1 * | 6/2002 | Fox | G01S 1/026 342/357.64 |
| 6,459,704 | B1 * | 10/2002 | Jandrell | G01S 5/02 370/343 |
| 6,675,018 | B2 * | 1/2004 | Villier | G01S 5/0215 455/456.1 |
| 6,756,940 | B2 * | 6/2004 | Oh | G01S 13/878 342/387 |
| 6,889,052 | B2 * | 5/2005 | Geier | H04W 64/00 342/357.4 |
| 6,917,644 | B2 * | 7/2005 | Cahn | G01C 21/26 370/320 |
| 7,030,811 | B2 * | 4/2006 | Goren | G01S 1/026 342/387 |
| 7,069,025 | B2 * | 6/2006 | Goren | G01S 1/026 340/10.2 |
| 7,250,906 | B2 * | 7/2007 | Goren | G01S 1/026 342/387 |
| 7,277,469 | B2 * | 10/2007 | Brunel | H04B 7/086 375/147 |
| 7,490,008 | B2 * | 2/2009 | Draganov | G01S 19/47 342/357.3 |
| 8,406,280 | B2 * | 3/2013 | Draganov | G01S 19/22 342/350 |
| 9,304,184 | B1 * | 4/2016 | Draganov | G01S 19/22 |
| 2001/0002203 | A1 * | 5/2001 | Cahn | G01C 21/26 375/142 |
| 2002/0048286 | A1 * | 4/2002 | Brunel | H04B 7/086 370/516 |
| 2002/0097182 | A1 * | 7/2002 | Goren | G01S 1/026 342/357.4 |
| 2002/0098852 | A1 * | 7/2002 | Goren | G01S 1/026 455/456.3 |
| 2002/0131393 | A1 * | 9/2002 | Baldridge | H04W 74/0875 370/343 |
| 2003/0036390 | A1 * | 2/2003 | Villier | G01S 5/0215 455/456.1 |
| 2003/0128161 | A1 * | 7/2003 | Oh | G01S 13/878 342/387 |
| 2004/0203871 | A1 * | 10/2004 | Geier | H04W 64/00 455/456.1 |
| 2006/0125690 | A1 * | 6/2006 | Goren | G01S 1/026 342/387 |
| 2006/0160545 | A1 * | 7/2006 | Goren | G01S 1/026 455/456.1 |
| 2006/0195262 | A1 * | 8/2006 | Draganov | G01S 19/47 701/472 |
| 2007/0025456 | A1 * | 2/2007 | McCrady | H04L 5/02 375/260 |
| 2007/0286264 | A1 * | 12/2007 | Kontola | H04B 1/7101 375/152 |
| 2010/0007555 | A1 * | 1/2010 | Ezal | G01C 21/005 342/357.3 |
| 2012/0022784 | A1 | 1/2012 | Louis et al. | |
| 2013/0051434 | A1 * | 2/2013 | Draganov | G01S 19/22 375/148 |
| 2014/0327576 | A1 * | 11/2014 | Kumar | H04B 7/086 342/367 |
| 2015/0282112 | A1 * | 10/2015 | Bialer | G01S 1/02 455/456.1 |

OTHER PUBLICATIONS

Clemons III, T.M. et al., Estimation Filters for Missile Tracking with Airborne Laser, Proc of SPIE, vol. 6328, No. 632801-1, pp. 1-11, Jan. 2006.
Won, Seong-hoon Peter, et al., Fastening Tool Tracking System Using a Kalman Filter and Particle Filter Combination, Measurement Science and Technology, vol. 22, No. 12, pp. 1-12, Nov. 2011.
Giremus, A. et al., "A Particle Filtering Approach for Joint Detection/Estimation of Multipath Effects on GPS Measurements," IEEE Transactions on Signal Processing, vol. 55, No. 4, Apr. 2007, pp. 1275-1285.
Glanser: A Scalable Location & Tracking System for First Responders, Status Update, Honeywell, Argon ST, TRX Systems, Aug. 6, 2012, 1-35.
Gui, G. et al., "Low-Speed ADC Sampling Based High-Resolution Compressive Channel Estimation," 15th International Symposium on Wireless Personal Multimedia Communications (WPMC), Sep. 24-27, 2012, pp. 473-477.
Gui, G. et al., "Sub-Nyquist rate ADC sampling-based compressive channel estimation," Wireless Communications and Mobile Computing (2013) Published online in Wiley Online Library (wileyonlinelibrary.com) DOI: 10.1002/wcm.2372.
Huerta, J. M. et al., "Joint Particle Filter and UKF Position Tracking in Severe Non-Line-of-Sight Situations," IEEE Journal of Selected Topics in Signal Processing, vol. 3, No. 5, Oct. 2009, pp. 874-888.
Liang, C. et al., "Mobile Tracking and Parameter Learning in Unknown Non-line-of-sight Conditions," the Proceedings of the 13th Conference on Information Fusion (Fusion) (Edinburgh, Scotland, Jul. 26-29, 2010), pp. 1-6.
Matz, G., "Recursive MMSE Estimation of Wireless Channels Based on Training Data and Structured Correlation Learning," In: Proc. of the IEEE/SP 13th Workshop on Statistical Signal Processing, Bordeaux, France (2005) pp. 1342-1347.
Needell, D. et al., "CoSaMP: Iterative Signal Recovery From Incomplete and Inaccurate Samples," Applied and Computational Harmonic Analysis, vol. 26, Issue 3, 2008, pp. 301-321.
Ozen, S. et al., "Time-of-Arrival (TOA) Estimation Based Structured Sparse Channel Estimation Algorithm, with Applications to Digital TV Receivers," In proceeding of: Acoustics, Speech, and Signal Processing, 2003. Proceedings. (ICASSP '03). 2003 IEEE International Conference on, vol. 4, pp. 481-484.
Sattarzadeh, S.A. et al., "TOA Extraction in Multipath Fading Channels for Location Estimation," 17th International Symposium on Personal, Indoor and Mobile Radio Communications, IEEE Computer Society Press, Los Alamitos (2006), pp. 1-4.
Weigand, D. et al., "The GEOCOM Mobile Positioning System," ION GNSS+ Sep. 16-20, 2013, Nashville, Tennessee, pp. 1-9.

\* cited by examiner

POSITIONING IN INDOOR LOCATIONS AND OTHER GPS-DENIED ENVIRONMENTS

FIELD

The disclosure is related to positioning systems and, more particularly, to positioning methods and systems used in locations where signals are susceptible to heavy interference, noise, or multipath.

BACKGROUND

A Global Positioning System (GPS) is a positioning system that may be used to determine the specific location of a GPS receiver by calculating ranges from the receiver to multiple satellites. Many mobile telephones include GPS functionality, which allow applications to identify the location of the mobile telephone and provide services based on that location, such as providing a map display or driving directions. GPS works well in environments that have a clear line of sight (LOS) between the receiver and transmitters (e.g., satellites) used to determine position of the receiver. However, GPS is not available or does not function well in all environments.

In indoor locations and other GPS-denied environments, other positioning systems may be used. One example is the GEOCOM Mobile Positioning System developed by The Boeing Company. The GEOCOM system combines local inertial, magnetic, and barometric data for each receiver with peer-to-peer ranging signals received from other receivers within a reception range. The peer-to-peer range estimates are combined with the local sensor data to determine accurate position estimates of each receiver.

But even with these positioning systems, signals may become corrupted by noise, interference, and multipath. Multipath occurs when signals do not directly travel to a receiver, but instead are reflected off of walls or other obstructions before arriving at the receiver. Thus, it is beneficial to develop ranging solutions that distinguish these reflected paths and account for their contributed errors. This is especially beneficial when the positioning system is being used in emergency situations where knowing the locations of users is critical.

SUMMARY

A method for extracting Doppler/velocity measurements by using the minimum variance distortionless response (MVDR) algorithm at sub Hertz resolution for Doppler differentiation is disclosed. The method for extracting Doppler/velocity measurements includes receiving in-phase and quadrature samples from a radio frequency based wireless communication system; correlating the samples against a known pattern to produce a correlation surface; generating a spectral estimate using the MVDR algorithm at sub-Hertz resolution; predicting which path is a line of sight path; and converting the line of sight path to a velocity measurement. This method may also include using a time of arrival (TOA) estimator to generate a range measurement.

A method for estimating the clock bias errors between two ranging units that uses spectrum exchanges, a modified aliased correlation, and an aliased Kalman filtering estimation to achieve usable Doppler measurements is also disclosed. The estimate of clock bias may be used to remove a frequency error component of the clock bias prior to generating a velocity measurement.

A method for estimating range and velocity using range and velocity measurements from multiple sources is also disclosed. The method uses external or known system probability knowledge to improve the final estimate. The method produces a probability solution tree that can be tuned to the desired use of processing resources.

The method for estimating range and velocity includes receiving range and velocity measurements; estimating range, velocity, and acceleration for a number of particle hypotheses; comparing the estimates to a probability density function; selecting and testing measurements based on the comparison; discarding any particles that fail to meet a threshold; and updating the measurements for the non-discarded particles. The method also includes selecting particles based on clustering and associating a confidence solution to the selected particles.

A method for extracting range measurements using a combination of compressive sensing and classical channel estimation techniques by combining information from the in-phase and quadrature components of the signal is also described. The method for extracting range measurements includes receiving in-phase and quadrature samples from a radio frequency based wireless communication system; applying a time shifting preserving transform to produce a set of equations; solving the set of channel equations; applying sparse channel compressive sensing; and applying a fading accumulator on the channel estimates to focus on steady peaks.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Presently preferred embodiments are described below in conjunction with the appended drawing figures, wherein like reference numerals refer to like elements in the various figures, and wherein.

Figure 1:
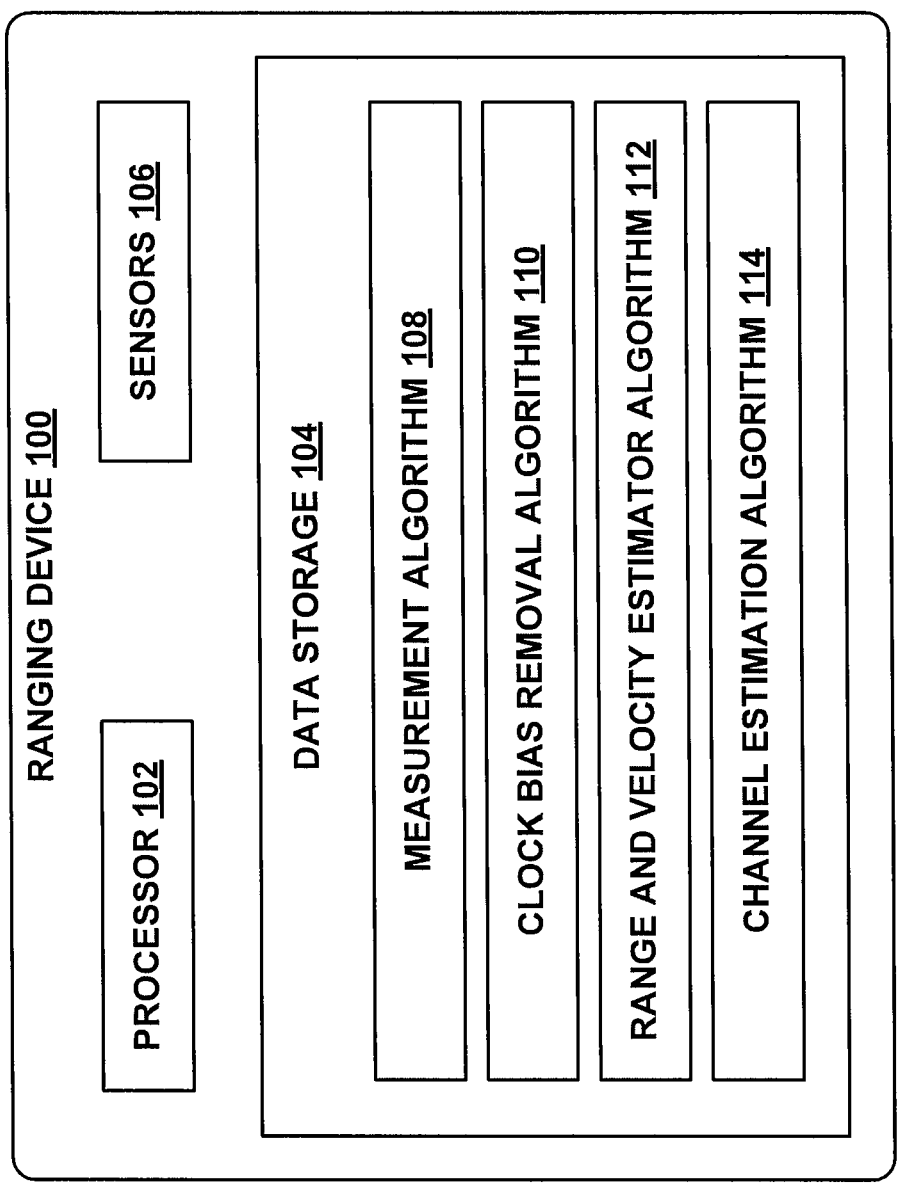
FIG. 1 is an illustration of a ranging device, according to an example.

The drawings are for the purpose of illustrating example embodiments, but it is understood that the inventions are not limited to the arrangements and instrumentality shown in the drawings.

DETAILED DESCRIPTION

FIG. 1 depicts a block diagram of a ranging device 100. The ranging device 100 is a computing platform that receives signals from other ranging devices. For example, the ranging device 100 may be a geospatial locator unit used in a mobile positioning system. The ranging device 100 may also be a mobile telephone, a tablet computer, sensor device, or any other computing device capable of measuring range and velocity relative to one or more other ranging devices. The ranging device 100 may also transmit signals to other ranging devices.

The ranging device 100 is a combination of hardware and software components including a processor 102, data storage 104, and sensors 106. The processor 102 may be one or more processors suitable for receiving input signals, executing machine language instructions, and providing output signals. The processor 102 receives input signals from the data storage 104, the sensors 106, and external sources. The processor 102 receives input signals from external sources over a wireless network via wireless links, such as Bluetooth, any version of IEEE 802.11, or other wireless based communication links.

The data storage 104 stores instructions that, upon execution by the processor 102, cause the ranging device 100 to perform functions. Preferably, the data storage 104 includes non-transitory media, such as secondary or persistent long term storage. The data storage 104 may also include transitory computer readable medium, such as computer-readable media that stores data for short periods of time. The data storage 104 may include any volatile or non-volatile storage systems.

The data storage 104 includes a measurement algorithm 108, a clock bias removal algorithm 110, a range and velocity estimator algorithm 112, and a channel estimation algorithm 114. The data storage 104 may include other algorithms as well. The algorithms 108-114 may be written in a suitable computer programming language, such as C++. The algorithms 108-114 are further described with respect to FIGS. 2-6.

The sensors 106 may include an inertial measurement unit (IMU), a barometer, and a magnetometer. The IMU includes a combination of accelerometers and gyroscopes. The sensors 106 may also include a GPS receiver for use when GPS signals are available. In this scenario, the ranging device 100 uses the GPS position solution until the environmental conditions are not suitable to receive or use GPS signals. The last known position from GPS is then used to initialize a position solution based on the other sensors' measurements and peer-to-peer ranging signals received from other ranging devices in the area.

Figure 2:
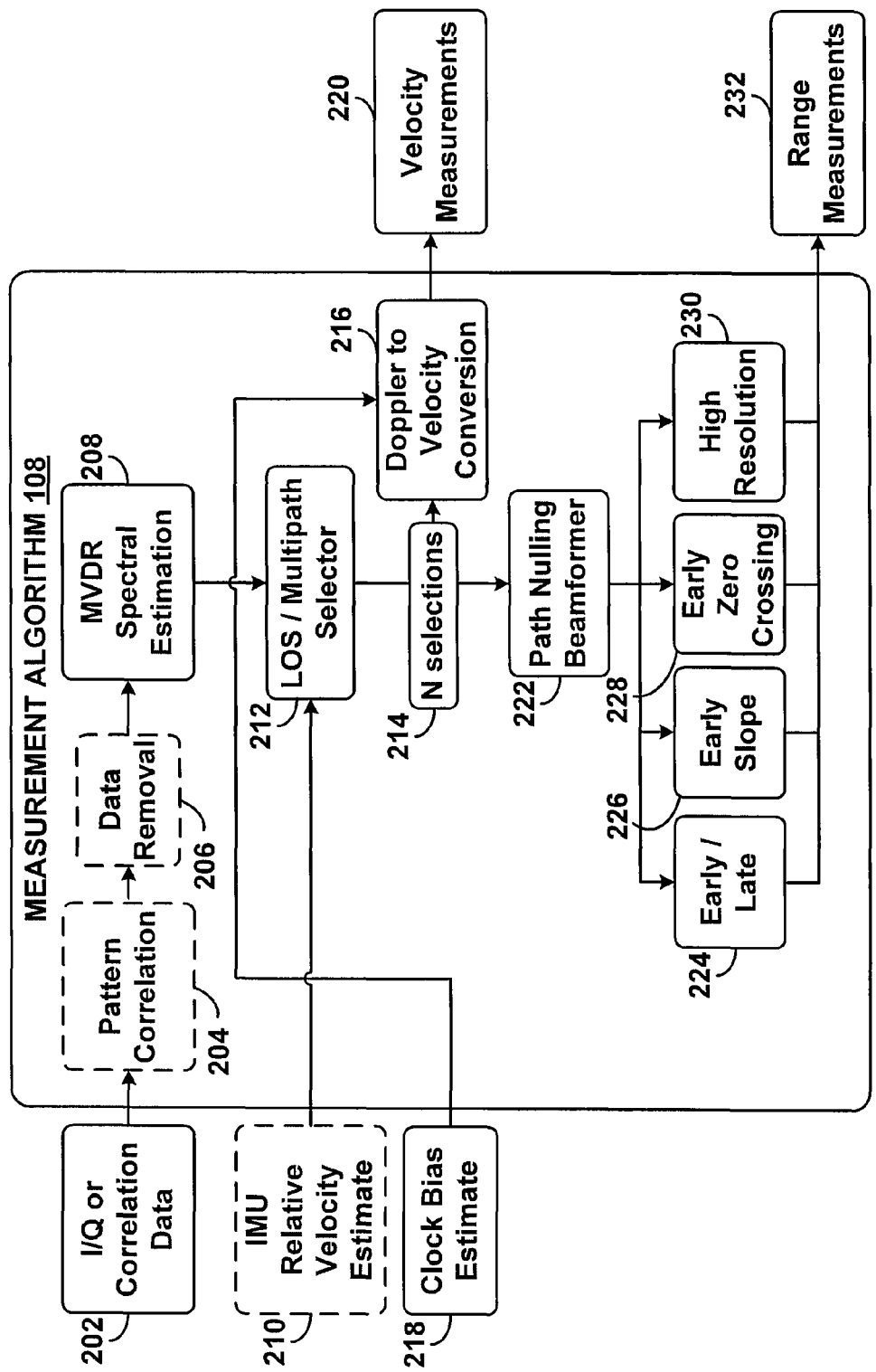
FIG. 2 is an illustration of a measurement algorithm, according to an example.

FIG. 2 is an illustration of the measurement algorithm 108. In the example shown in FIG. 2, the measurement algorithm 108 receives in-phase and quadrature (IQ) samples 202 from a radio frequency (RF) based wireless communication system. While a typical RF-based wireless communication system is described, the algorithms 108-114 are also suitable for use with other systems that measure range using sound waves, pressure waves, light, or other sources of range and velocity information. Indeed, the algorithms 108-114 can use a number of different measurements types and combine the different sources of range and velocity.

In the RF example, the ranging device 100 receives a waveform with a known pattern in the form of IQ samples, which are then captured and digitized. At block 204, the measurement algorithm 108 cross-correlates the IQ samples against the known pattern to produce a correlation surface. If the pattern contains modulated information overlaid as in a spread spectrum system, at block 206, this data is removed by way of a feedback mechanism. The cross correlation can be accumulated to provide additional gain at the expense of limiting the representable bandwidth.

Figure 7:
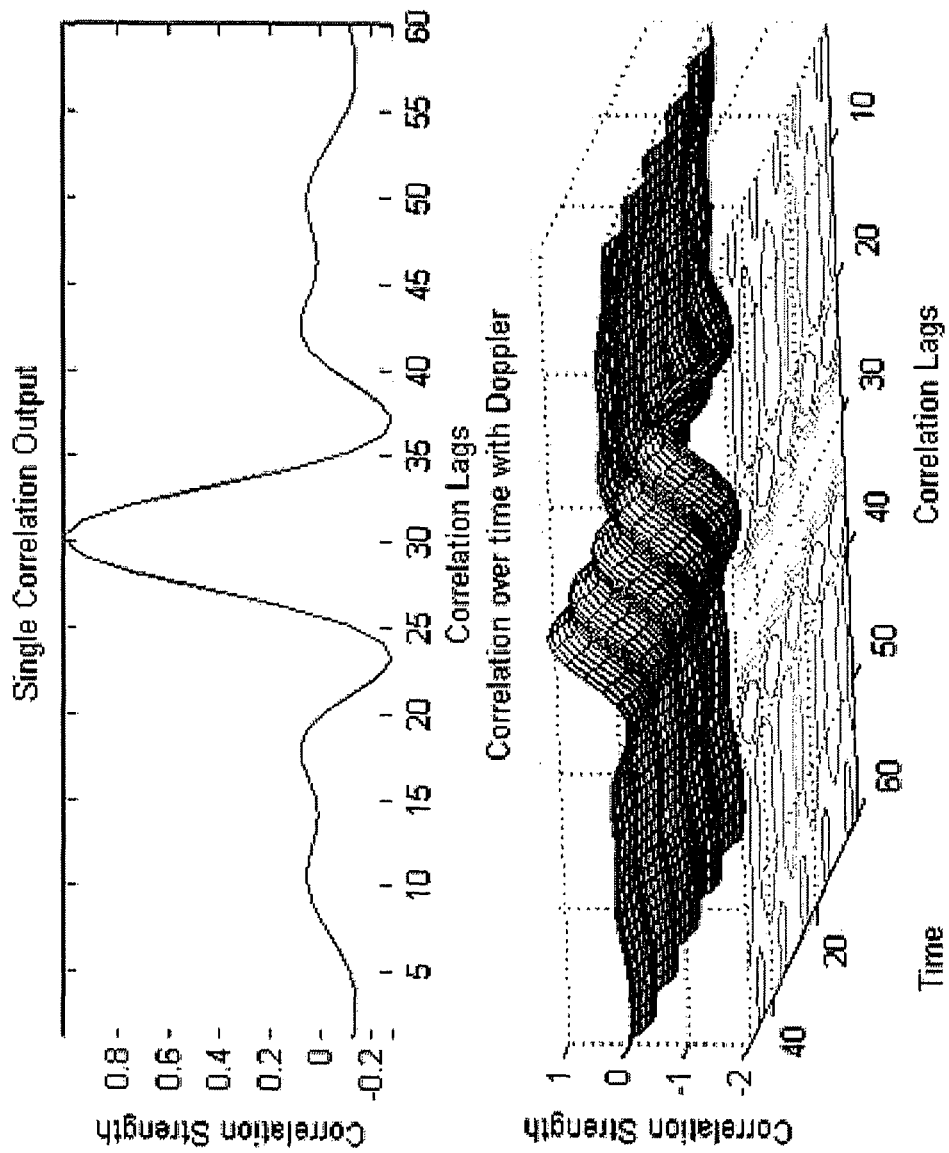
FIG. 7 is an illustration of a correlation surface over time with Doppler, according to an example.

The measurement algorithm 108 uses a spectral estimation technique 208 to generate a high precision spectral estimate. The spectral estimation technique 208 takes the peak samples over time of the correlation surfaces and extracts the high resolution frequency information. FIG. 7 depicts an example correlation surface over time with Doppler.

Figure 8:
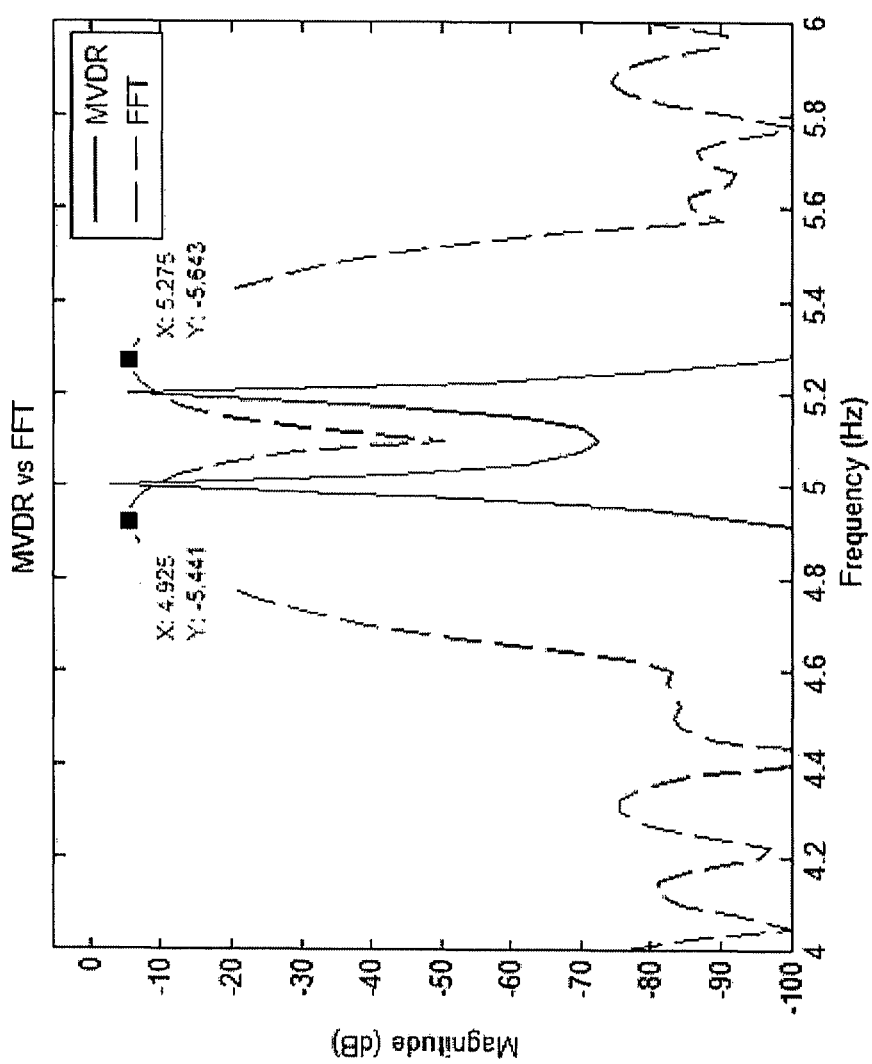
FIG. 8 is an illustration comparing a minimum variance distortionless response algorithm result with a fast Fourier transform result, according to an example.

In one example, the spectral estimation technique 208 uses the minimum variance distortionless response (MVDR) algorithm, preferably, at a sub-Hertz resolution. The MVDR algorithm has advantages over classical methods by better utilizing the available information and achieving higher spectral resolution with the same information. This high resolution allows the spectral estimation technique 208 to separate out multipath Doppler frequencies that are very close together. In FIG. 8, the true frequencies are 5 and 5.2 Hz with fast Fourier transform (FFT) and MVDR spectrum estimates computed from 256 samples.

Once the spectral estimate is generated, external information 210 may be used to further distinguish and assign importance to the spectral peaks' channel paths 214. For example, if an IMU with a navigation engine is available, the estimate of the current relative velocity between two ranging devices 100 may be used to predict which path is the line of sight (LOS) at 212. Other information, such as relative power or delay, may also be used to discriminate between the detected paths.

At block 216, the measurement algorithm 108 converts Doppler frequencies of the selected paths 214 to velocities 220 for use in the range and velocity estimator algorithm 112. The Doppler frequency is converted to velocity by taking into account the speed of the waveform or propagation velocity through the average transmission medium. The estimated clock bias is used to correct the frequency estimate as described in Equation 1.

Velocity Computation                                   Equation 1

$$\text{Velocities}(220) = \left(\text{PathFrequencies}(214) - \left(\frac{\text{ClockBias}(218)}{2}\right)\right) * -\left(\frac{\text{PropagationVelocity}}{\text{CarrierFrequency}}\right)$$

One source of error in these frequency estimates is from oscillator clock differences between a transmitter and the receiver in two ranging devices 100. This clock error or 'clock bias' can be two orders of magnitude larger than the frequency estimate result and so the ranging device 100 may use a clock bias estimate 218 calculated by the clock bias removal algorithm 110 to correct the velocity measurements 220. The clock bias removal algorithm 110 is described with respect to FIG. 3.

Figure 3:
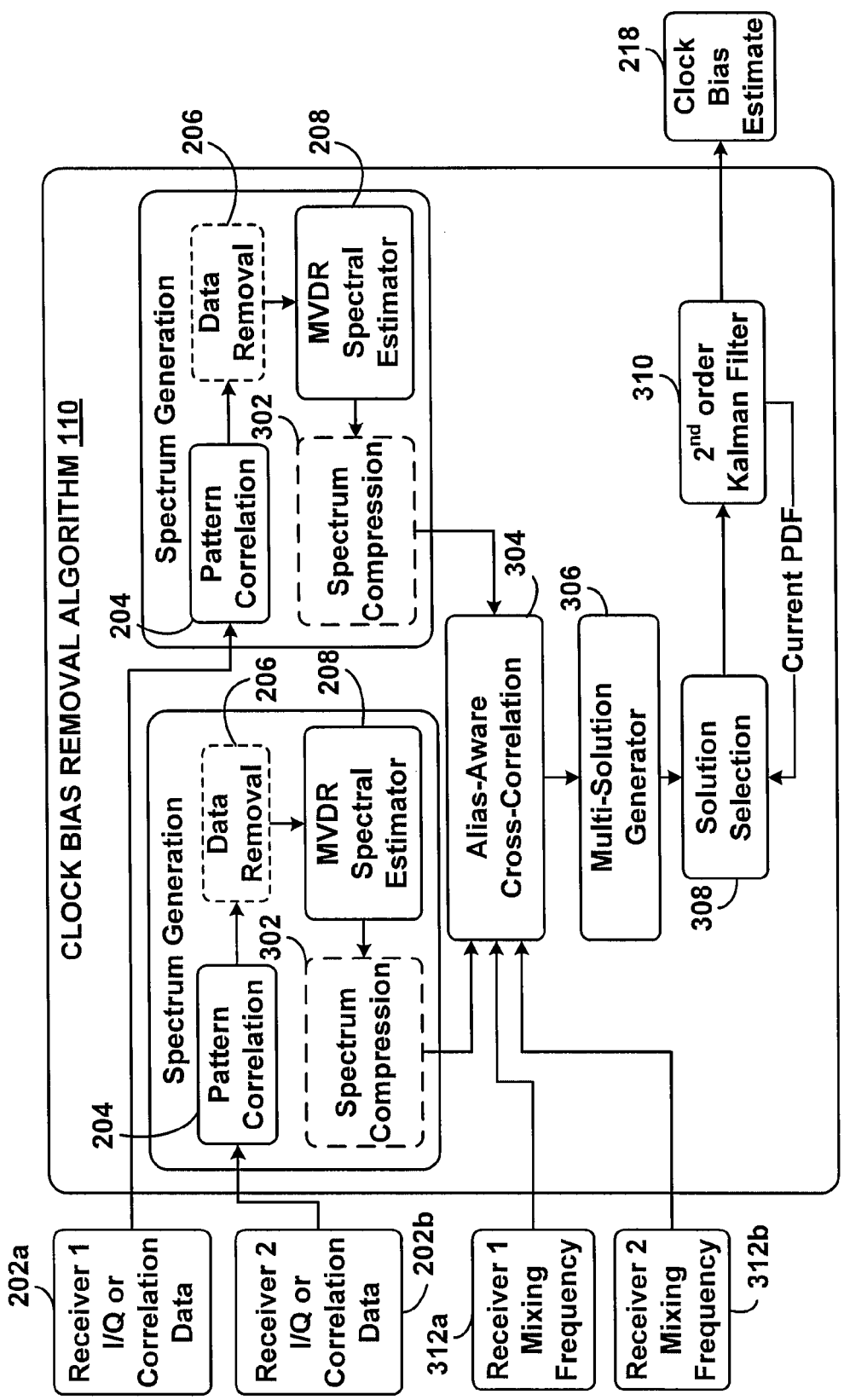
FIG. 3 is an illustration of a clock bias removal algorithm, according to an example.

FIG. 3 is an illustration of the clock bias removal algorithm 110. In the RF-based wireless communication system, each receiver, including the ranging device 100, has an unsynchronized oscillator tuned at a particular reference frequency. This frequency has a non-static error due to physical and manufacturing limitations. The magnitude of the frequency error and the rate at which it changes are parameters of the type and quality of the hardware oscillator used in the system.

These errors translate into a frequency and timing error within positioning systems that can cause large deviations in the Doppler and time of arrival estimates. As described further, the clock bias removal algorithm 110 removes the frequency error component of the clock bias error in order to acquire absolute knowledge of the Doppler frequency from the spectral estimation techniques.

The clock bias removal algorithm 110 leverages the exchange of spectral estimates between two ranging devices. The transfer function of the RF channel is assumed to be reciprocal in the forward and reverse directions and is sufficiently stationary in time to acquire both forward and reverse spectral measurements. Each ranging device produces spectral estimates that contain the relative clock error and any Doppler shifts from the RF paths (LOS or multipath) present in the channel.

Also, while both ranging devices experience the same Doppler shift due to motion, the relative clock error will be negated between each other. For example, the two ranging devices described as Unit1 and Unit2 will experience a frequency shift in their spectrum estimates as SE1 and SE2 as follows.

SE1=(ClockError(Unit1)−ClockError(Unit2))+Doppler

SE2=(ClockError(Unit2)−ClockError(Unit1))+Doppler      Equation 2—Frequency Shift in Spectrum Estimates If the spectral estimates from both units are gathered, then the clock bias removal algorithm 110 can cancel clock error by adding the frequencies SE1 and SE2, resulting in no bias but a doubling of any Doppler shift. Also, the clock bias removal algorithm 110 can calculate the relative clock bias by subtracting the clock errors and dividing by two (i.e., (SE1−SE2)/2).

Upon receiving IQ samples 202a, 202b, the clock bias removal algorithm 110 cross-correlates the IQ samples against the known pattern to produce a correlation surface 204, removes modulated information 206, and generates a spectral estimate 208 as previously described with respect to the measurement algorithm 108. The spectral estimates may be represented as follows.

Spectral Estimate=$e^{j*2*\pi*(f_{clock}(i)-f_{clock}(k)+f_d(n))}$      Equation 3—Spectral Estimates where $f_{clock}(i)$ and $f_{clock}(k)$ are the clock biases from unit(i) and unit(k) oscillator, and $f_d(n)$ is the Doppler shift for each particular path 1:N.

Once these measurements are available on the respective ranging devices, the clock bias removal algorithm 110 may optionally implement a spectrum compression algorithm based on principal component analysis (PCA) 302 to allow for efficient sharing of the information over a data channel. The PCA technique is used to classify spectrum by a set of orthogonal components, a subset of which contain the majority of the spectrum information. By selecting a subset of the principal components, the technique effectively acts as a lossy compression algorithm that can be used to reproduce the spectrum with high fidelity.

Figure 9:
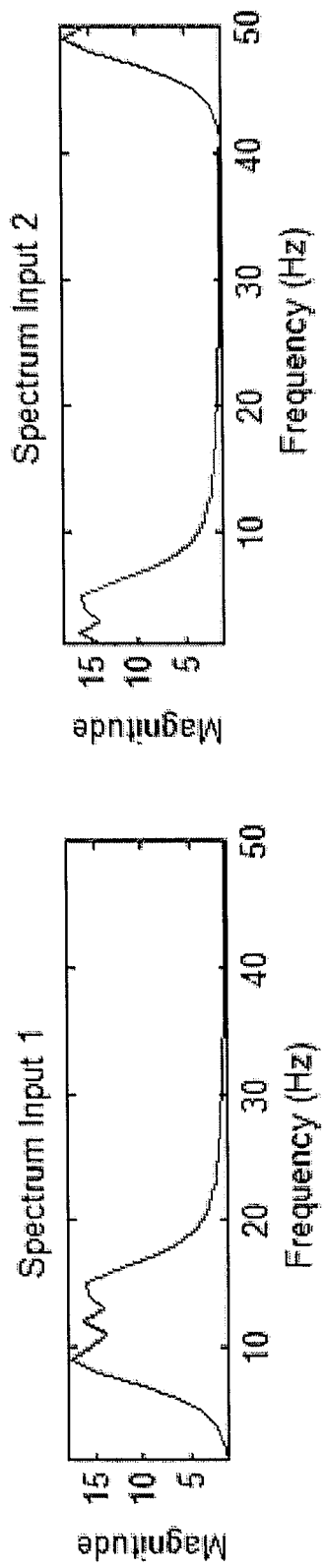
FIG. 9 is an illustration of two spectral estimates, according to an example.

After the spectral estimates are co-located, the clock bias removal algorithm 110 performs an alias-aware cross-correlation (AACC) 304 that can handle the frequency limited nature of the spectrum estimates. The inputs to the AACC 304 are two spectral estimates where the spectral data may wrap circularly around due to aliasing. Examples of two spectral estimates are depicted in FIG. 9. In order to match the data from one spectral estimate to another that may be partially wrapped, the AACC 304 correlates the two spectrums by circularly shifting one of the spectrums around the aliasing point. The known receiver mixing frequencies 312a, 312b are used to adjust the clock offset present in the clock bias due to the mixing frequencies (i.e., clockBiasEst=clockBiasEst−(mixFreq1−mixFreq2)). This clock bias estimate is then used as the input into a multi-solution generator 306.

The clock bias removal algorithm 110 uses the multi-solution generator 306 to create different potential clock bias frequencies for the clock bias estimate 218. This is because there is an inherent ambiguity present in the AACC 304 result when the spectrum is aliased one or more times. The multi-solution generator 306 creates a set of potential solutions given zero or more aliases, each at increments of the Nyquist frequency from the base clock bias. The maximum number of potential aliases considered is dictated by the drift rate of the ranging unit's oscillators.

The clock bias removal algorithm 110 provides the different potential clock bias frequencies obtained from the multi-solution generator 306 to a solution selection algorithm 308. The solution selection algorithm 308 uses a $2^{nd}$ order Kalman filter 310 that tracks frequency and delta frequency of the clock bias, allowing process noise to account for the changes in acceleration.

$$\text{Kalman Filter State} = \begin{bmatrix} \text{clock bias (Hz)} \\ \text{relative clock velocity } (\Delta\text{Hz}) \end{bmatrix} \quad \text{Equation 4}$$

When a new set of potential clock bias frequencies are available, the Kalman filter's new prediction is used to select out of the possible clock biases and select the best possible measurement. The clock bias removal algorithm 110 then introduces the new selected measurement into the Kalman filter 310 for that time step to finalize the clock bias estimate 218, which may then be used by the measurement algorithm 108 to generate velocity measurements 220.

Figure 10:
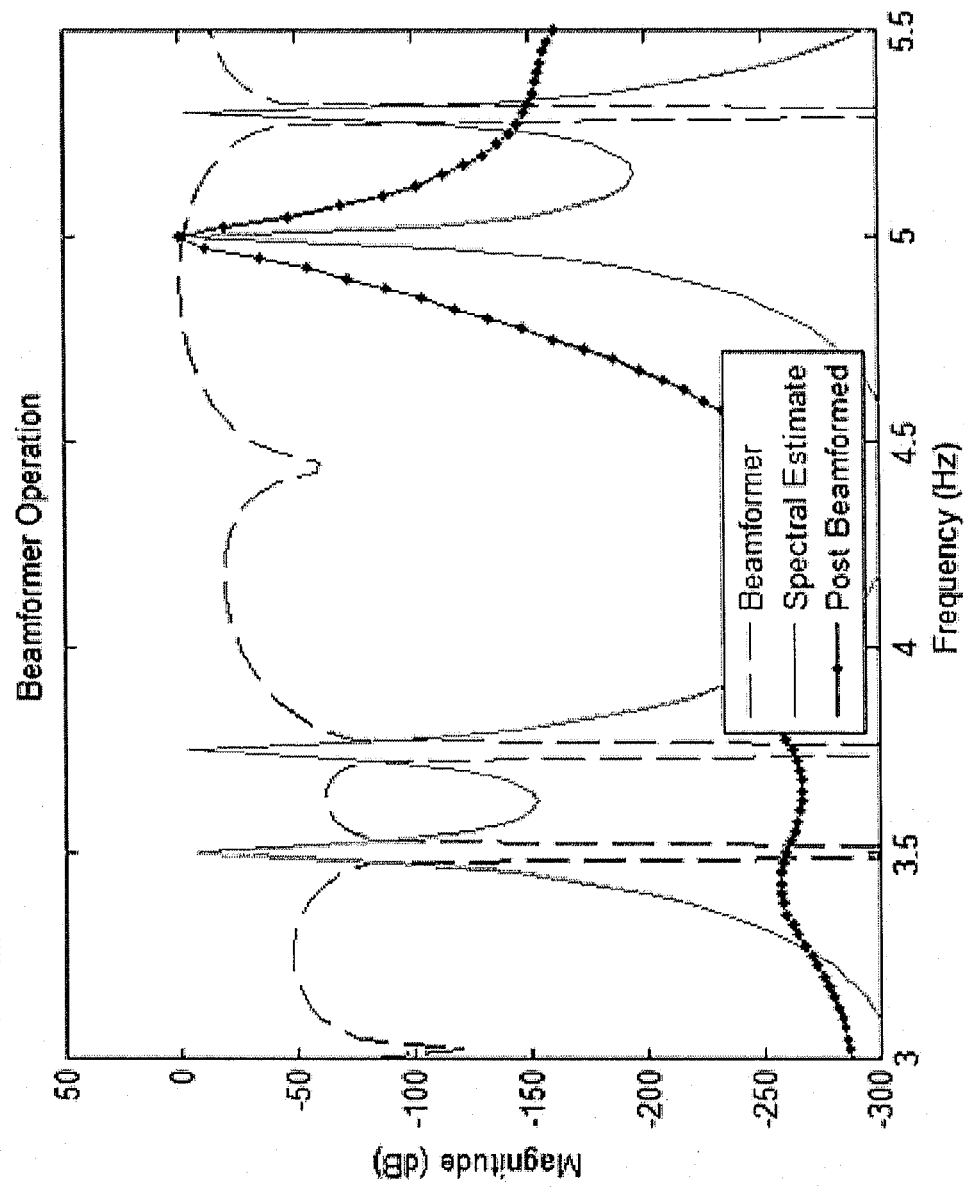
FIG. 10 is an illustration of path nulling beamformer operation, according to an example.

Returning to FIG. 2, the measurement algorithm 108 also provides the selected potential paths 214 to a path nulling beamformer 222, which removes as much of the energy from the competing paths as possible. The beamformer 222 acts like a filter focusing on the angles (frequencies) of interest while generating deep nulls at known frequencies with unwanted energy. In order to extract the measurement specific to one of the paths of interest, a single path is isolated and the energy of competing paths is removed, if possible. FIG. 10 is an example of the path nulling beamformer 222 operation.

The measurement algorithm 108 provides the resulting samples from the beamformer 222 to a variety of different time of arrival estimation methods 224-230 to generate range measurements 232. For example, the measurement algorithm 108 may use one or more of the Early/Late 224, Early Slope 226, Early Zero Crossing 228, and High Resolution 230 interpolator methods to generate range measurements 232. The measurement algorithm 108 may use other time of arrival estimation methods to produce a correlation peak range measurement based on the correlation pulse shape, such as the Gardner method. Which TOA estimator method used may be selected based on the needs of the range and velocity estimator algorithm 112, which can utilize numerous range measurements per time step, and different sources and techniques can provide additional information for estimation.

Figure 4:
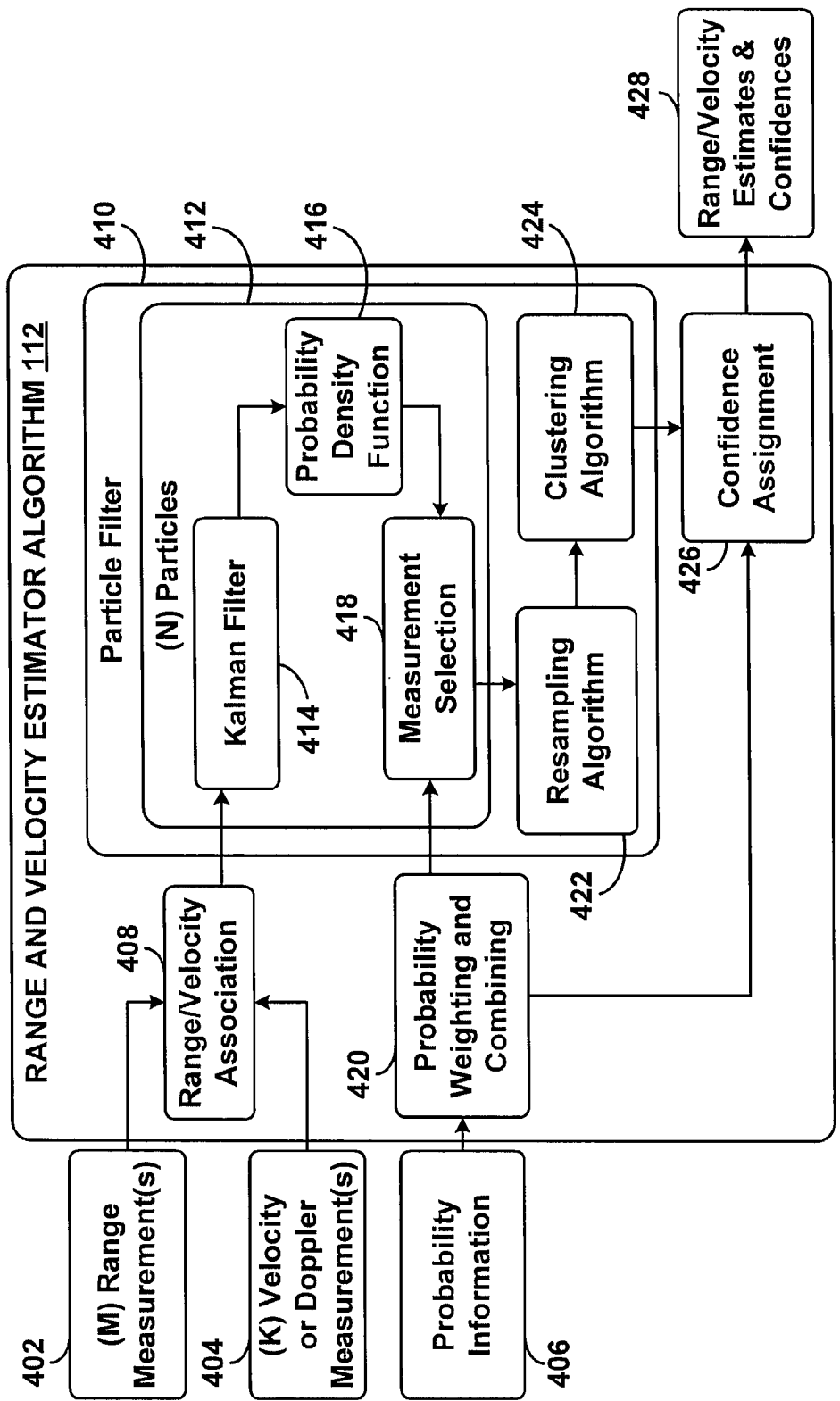
FIG. 4 is an illustration of a range and velocity estimator algorithm, according to an example.

FIG. 4 is an illustration of the range and velocity estimator algorithm 112. The estimator algorithm 112 receives range measurements 402 (M range measurements, where M≥0), velocity measurements 404 (K velocity measurements, where K≥0), and probability information 406. In one embodiment, the estimator algorithm 112 receives the range and velocity measurements 232, 220 from the measurement algorithm 108. However, the estimator algorithm 112 may receive the range measurements 402 from any available technique, such as from the channel estimation algorithm 114, while the velocity measurements 404 may be derived from Doppler or an alternative method.

The probability information 406 is any information that reflects the quality or confidence of the range and velocity measurements 402, 404. For example, the probability information 406 may include relative power, absolute power, signal to noise ratio, and navigation filter range and relative velocity estimates. The probability information 406 may be used to select which inputs to be used by the estimator algorithm 112 based on the likelihood that one measurement is better than another. In one example, the probability information 406 is provided by the sensors 106.

The inputs 402-406 to the range and velocity estimator algorithm 112 are not always available and, thus, the estimator algorithm 112 may receive the following possible sets of inputs:

Sets of range/velocity measurements 402, 404 with or without external probability information 406;
Sets of range only measurements 402 with or without external probability information 406; and
Sets of velocity only measurements 404 with or without external probability information 406.

After receiving the range and velocity measurements 402, 404, the estimator algorithm 112 associates the measurements at block 408. Each set of ranges is extracted from specific path and Doppler frequency isolated by the beamformer 222, and that frequency was converted to a velocity in 216. The set of ranges are, therefore, associated with that corresponding velocity measurement for further processing.

The range and velocity estimator algorithm 112 uses an algorithm derived from Rao-Blackwellized particle filter techniques 410 to solve for range and velocity while using available probability information 406 to discard contaminated or false measurements. Beneficially, the estimator algorithm 112 produces a probability based multi-solution tree that dynamically adjusts and prunes itself as new measurements are taken. The algorithm's processing complexity is highly tunable allowing a user to select the number of particles and tree size to match the needs of the system and application.

Figure 11:
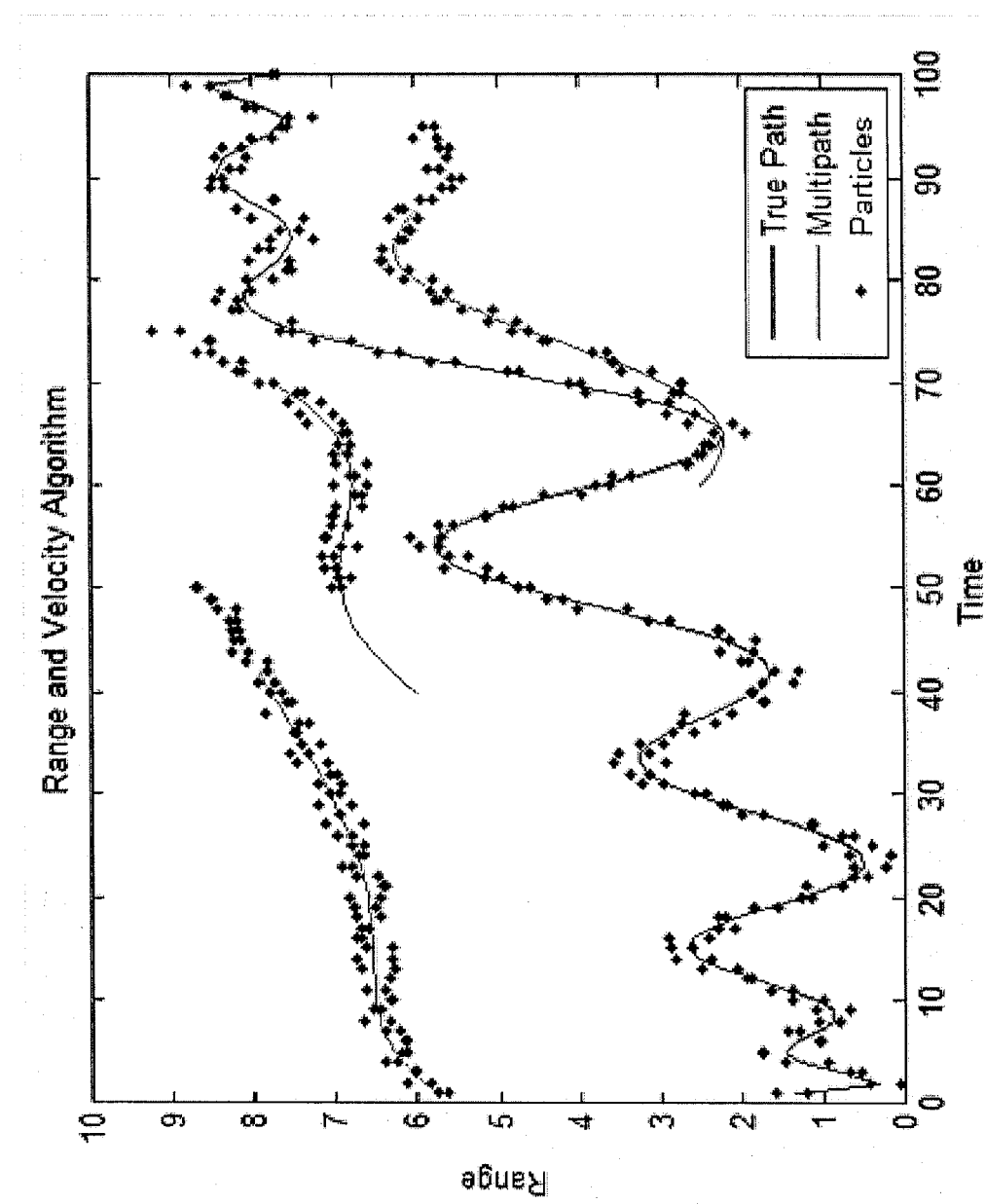
FIG. 11 is an illustration of particle filter operation, according to an example.

The particle filter 410 includes particles 412, a resampling algorithm 422, and a clustering algorithm 424. Each particle 412 in the particle filter 410 includes a Kalman filter 414 with an associated probability density function (PDF) 416, and a measurement selector 418. In one example, the particle filter 410 is a Rao-Blackwellized particle filter variant with specific extensions, but other particle filter designs may be used. FIG. 11 is an example of particle filter operation.

Preferably, the Kalman filter 414 is a $3^{rd}$ order polynomial filter that estimates range, velocity, and acceleration. The inclusion of acceleration estimation in the Kalman filter 414 is useful, because unlike velocity in navigation, relative velocity between two ranging nodes does not normally stay constant with normal straight line human movement. Acceleration delta is handled by a small amount of process noise tuned to the expected acceleration changes in the system.

$$\text{Kalman Filter State} \qquad\qquad \text{Equation 5}$$

$$\text{Kalman Filter State} = \begin{bmatrix} \text{range} \\ \text{relative velocity} \\ \text{relative acceleration} \end{bmatrix}$$

Figure 5:
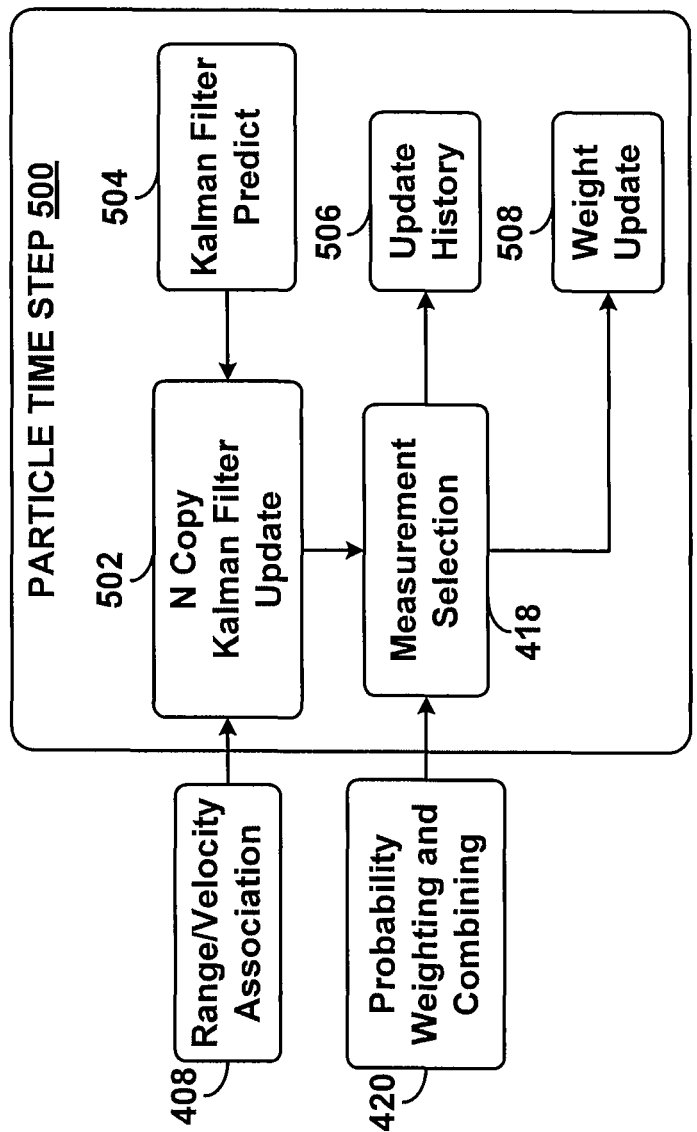
FIG. 5 is an illustration of a particle time step, according to an example.

The operation of the particle filter 410 is described with respect to FIG. 5. At the beginning of each measurement time step 500, each particle's Kalman filter predict function 504 is executed. The predict function 504 estimates the range, velocity, and acceleration parameters based on past history. The covariance of each particle's Kalman filter 414 is also decreased after estimating range, velocity, and acceleration.

Each particle 412 then copies the Kalman filter state information N times, one for each newly associated range, velocity, or range/velocity pair measurements from block 408. Each copied state information is then updated using one of the measurements from block 408 using the Kalman filter update algorithm 502. The update algorithm 502 generates an estimate based on those measurements, and updates the state and covariance of the filter 414.

Alternatively, if the number of measurements is high and processing is a consideration, the measurements can be clustered via a density based clustering algorithm and weighted accordingly using the external probability information input at block 420. This can reduce the effective number of measurements introduced into 502 and, therefore, reduce the number of Kalman filter updates executed per particle 412. The weighting in block 420 is selected depending on the strength that the information assists in selecting the correct path, range, or velocity.

Some examples of external probability information are path signal to noise ratio (SNR) as well as relative and absolute velocity measurements extracted from an Inertial Measurement Unit (IMU) based navigation filter. The SNR is often highly indicative of the line of sight path or at least of the potential corruption present in that path. Relative velocity from a navigation filter can weighted depending on the current covariance of the filter. The absolute velocity can be used to indicate the lack of Doppler and dictate if the channel estimation measurements from the channel estimation algorithm 114 should be used.

Once all the Kalman filter updates have been processed for each particle 412, the measurement selection algorithm 418 compares the updated results for each particle 412 with how close they were to the prediction's 504 PDF 416 and any information 420 obtained from the external probability information 406. Each particle 412 may select a different measurement or no measurement if none of the measurements is aligned with the prediction PDF 416. If a measurement was accepted into the particle 412, the measurement selection algorithm 418 updates the update history 506 to indicate the time since last update.

If none of the measurements met the minimum threshold to update the particle, the measurement selection algorithm 418 performs a random roll (e.g., (0<rand<1)>0.5) to decide if the best available measurement candidate is introduced despite the divergence from the PDF 416. The measurement selection algorithm 418 updates the weight 508 with the final covariance of the particle's filter 414.

Returning to FIG. 4, the resampling algorithm 422 receives the updated measurements from the current time step for the particles 412. The resampling algorithm 422 tests the particles 412 based on their weight and decaying importance history, which is based on the prior length of time between valid measurements. Any particles 412 that fail to meet a specified threshold are pruned and a new particle 412 is generated based on the results of the clustering algorithm 424. The threshold is created by the nominal or worst case measurement update rate of the system and can be static or dynamic based on environmental conditions.

Particle Weight Adjustment    Equation 6

$$pWa = \frac{Tp}{T_{last}}, 0 < pWa < 1$$

where Tp is the update period based on history, $T_{last}$ is the time since last update, and pWa is the particle weight adjustment based on time update rate. $T_p$ should be bounded, but adjusted dynamically based on a running mean of the time between updates.

$$pW(k+1) = pW(k)*LHF*Pr_{Ext}*Pr_{Good}*pWa \quad \text{Equation 7—Particle Weight}$$

where pW is the final particle Weight, LHF is the likelihood function of the measurement versus the Kalman Filter's PDF, $Pr_{Ext}$ is the any external probability information, and $Pr_{Good}$ is the general probability that the measurement is good.

In one example, the clustering algorithm 424 is a density based clustering algorithm (DBCA). The DBCA is derived from the Density-Based Spatial Clustering of Applications with Noise (DBSCAN) algorithm with modifications to cluster in two dimensions for range and velocity.

The clustering algorithm 424 is used to generate two analysis groupings for the resampling step, one for the current measurement ranges and another for pre-resampling particle ranges. If a measurement cluster is identified that does not have a representative particle, the resampling algorithm assigns the replacement particle to represent it. Otherwise, the replacement particle is generated at the range of the lowest mean particle density from the pre-resampling group. Additionally, if a cluster is found to have too many particles representing it (e.g., >10% particles), then the subset of the cluster's particles with the lowest weights are pruned and reassigned as above.

After the resampling 422 has occurred, the clustering algorithm 424 creates another grouping for post-resampling particle ranges, which are used to represent distinct N potential solution clusters (PSC). These clusters are then processed by the confidence assignment algorithm 426 to associate the solution clusters with a confidence assignment based on the associated particle weights 508 and the combined probability for the applied measurements at block 420.

Specifically, each solution cluster is composed of N particles with a mean range, mean velocity, variance, mean particle weight, and any external probability information 406. The variance, mean particle weight, and external probability information are combined to create a confidence value. The specific weighting of these individual inputs into the confidence assignment is dictated by the strength of the external probability information and nominal magnitude of the noise process associated with the ranges.

Solution Cluster    Equation 8

$$\text{Solution Data } (1 \ldots N) = \begin{bmatrix} E(PSC_r(n)) \\ E(PSC_v(n)) \\ \text{var}(PSC_r(n)) \\ E(PSC_w(n)) \\ Pr_{Ext}(PSC_w(n)) \end{bmatrix}$$

$$\text{Solution } (1 \ldots N) = \begin{bmatrix} E(PSC_r(n)) \\ E(PSC_v(n)) \\ \text{Confidence} \end{bmatrix}$$

where $PSC_{r,v,w}$ are the potential solution cluster's mean range, velocity, and weight.

The output 428 of the range and velocity estimator algorithm 112 is a set of range and velocity estimates with associated confidences as shown in Equation 8. The maximum number of reported estimates may be limited by the confidence assignment as needed to prevent latter algorithms from processing unnecessary estimates. This approach is different than general particle filter implementations that generate an estimate based on a weighted average of all the particles.

Beneficially, the range estimate from the range and velocity estimator algorithm 112 can be used with channel estimation to extract improved range measurements. In most systems, channel estimation is used to correct for channel induced sample corruption that affects the estimate of the data in the transmission. As described, channel estimation can also be used to directly solve for the line-of-sight path (LOS) delay, which can be used for ranging purposes.

The discrete system of a ranging radio transmitting a waveform over multipath channel can be described by:

$$y(k) = x(k)*h(k) + n(k). \quad \text{Equation 9—System Equation}$$

Here, x(k) is the waveform transmitted by the ranging radios, h(k) is the channel impulse response, n(k) is the noise contribution, and y(k) is the observed waveform received by the ranging radio. The transmitted waveform x(k) is known by the receiver.

Figure 6:
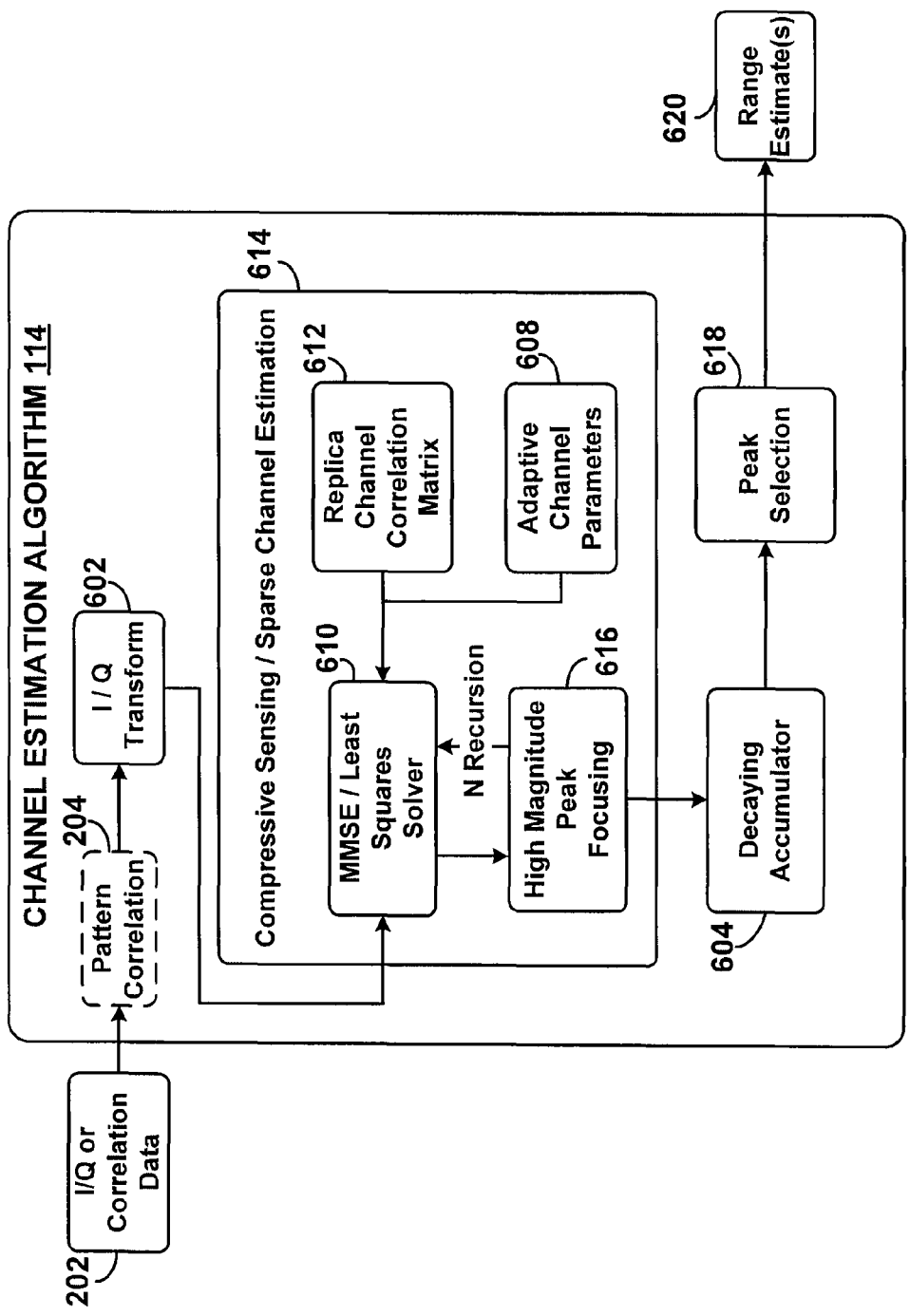
FIG. 6 is an illustration of a channel estimation algorithm, according to an example.

FIG. 6 is an illustration of the channel estimation algorithm 114. The channel estimation algorithm 114 makes assumptions regarding characteristics of the channel. Specifically, the channel estimation algorithm 114 assumes that the multipath channel is sparse such that most (e.g., >75%) of the channel energy seen by the ranging device 100 is concentrated in a few (e.g., <5) discrete delays or major paths. In other words, the channel response is composed of a few different impulses with varying amplitudes and delays. By taking advantage of this assumption, the channel estimation algorithm 114 improves a channel estimate by applying compressive sensing techniques.

A set of system equations can be constructed to estimate the multipath channel h(k) as follows:

Channel Estimation System Equations    Equation 10

$X \cdot h = y$, where $X$ is $NxM$, $h$ is $Mx1$, and $y$ is $Nx1$

-continued $$\begin{bmatrix} x(1) & 0 & \cdots & 0 \\ x(2) & x(1) & \ddots & \vdots \\ x(3) & x(2) & \ddots & 0 \\ x(4) & x(3) & \ddots & x(1) \\ \vdots & \ddots & \ddots & \vdots \\ x(N) & x(N-1) & \cdots & x(N-M+1) \end{bmatrix} \begin{bmatrix} h(1) \\ \vdots \\ h(M) \end{bmatrix} = \begin{bmatrix} y(1) \\ \vdots \\ y(N) \end{bmatrix}$$

where M is the maximum delay spread of the multipath channel and N is the size of the input block used. The maximum delay is dictated by the delay spread of the system, which is the maximum length of the multipath delay that contributes significant energy to the receiver. The matrix X is further known as the Replica Channel Correlation Matrix 612.

If the system requires additional processing gain or reduced processing speed, the known replica waveform can be correlated with the input waveform to add additional gain in a similar fashion as described with respect to the measurement algorithm 108. In this case, y(k) becomes a correlation output and x(k) is the replica autocorrelation. Otherwise, the set of equations hold and processing can be performed in the same fashion. Specifically, the channel estimation algorithm 114 acquires received IQ samples 202 and correlates them at block 204 with the expected pattern replica.

The channel estimation algorithm 114 then processes the individual I and Q correlations and combines them using a time shift preserving transform 602, such as a simple differencing. The transform 602 combines the two I/Q datasets to produce a single one with more information. This data set is then passed to the channel estimation algorithms 614 for further processing.

The least squares (LS) and minimum mean squares error (MMSE) solver algorithm 610 attempts to solve Equation 10 in order to estimate the channel response h(k). The two channel estimation techniques are related and the LS solver can be described as a subset of the MMSE solver. The least squares solver is described as follows:

$$\hat{h}(k) = X^{\#} y(k) \quad \text{Equation 11—Least Squares Solver}$$

where $X^{\#} = (X^H)^{-1} X^H$ is the pseudo-inverse of X. The MMSE solver is described as follows:

$$\hat{h} = R_h X^H (X R_h P^H + \sigma^2 I)^{-1} y(k) = X^{\#}(I - \sigma^2 R_y^{-1}) y(k) \quad \text{Equation 12—MMSE Solver}$$

where $R_h$ and $R_y$ are the autocorrelation matrices of h and y respectively. $R_h$, $R_y$, and the noise variance $\sigma^2$ are estimated in an adaptive fashion and are further described as the system adaptive channel parameters 608.

At startup, the least squares solver is used to estimate the channel while the channel parameters are estimated. Once the parameter estimates have converged, the MMSE solver is used. The adaptive channel parameters at block 608 are updated with each time step by estimating the autocorrelation matrices $\hat{R}_h$, $\hat{R}_y$ and noise variance $\sigma^2$ as follows Adaptive Channel Parameters  Equation 13

$$\hat{R}_{yy}(k) = (1-\lambda) \sum_{i=1}^{k} \lambda^{k-i} y(i) y^H(i)$$

$$\hat{R}_h(k) = X^{\#} \big(\hat{R}_{yy}(k) - \hat{\sigma}^2(k) I\big) X^{\#H}$$

-continued $$\hat{R}_y(k) = X \hat{R}_h(k) X^h + \hat{\sigma}^2(k) I$$

$$P = XX^{\#} \text{ and } P^{orth} = I - P$$

$$\hat{\sigma}^2(k) = \frac{1-\lambda}{N-M} \sum_{i=1}^{k} \lambda^{k-i} \| P^{orth} y(i) \|^2$$

where $0 < \lambda < 1$ is a forgetting factor, I is the identity matrix, $X^H$ is the hermitian transpose of X, and $X^{\#}$ is the pseudo-inverse of X.

After solving at block 610 for the channel estimate ĥ(k), the channel estimation algorithm 114 focuses on the highest magnitude peaks at block 616 above a set threshold. A new sparse channel estimate is $\hat{h}_s(k)$ is generated by creating an array with only the selected peaks from block 616. This channel estimate is then used to solve for the remaining received energy not represented by the sparse channel estimate.

Recursive Sparse Estimation  Equation 14

$$\hat{h}_s(k) = \begin{cases} \hat{h}(k), & \text{if } \hat{h}(k) > \text{thresh} \\ 0, & \text{otherwise} \end{cases}$$

$$y_d(k) = X \cdot \hat{h}_s(k)$$

$$y(k+1) = y(k) - y_d(k)$$

The new y(k+1) is then processed again by the LS/MMSE solver 610 in a recursive fashion. The recursion is stopped when the rms change in y is below some small threshold.

The finalized $\hat{h}_s(k)$ channel estimate from 616 is a transfer function describing the magnitude and delay of received LOS and multipath signals, where the earliest strong component or peak in time should be the LOS, if present. Therefore, if the channel is rapidly varying, the unstable multipath moves and changes while the delay of the LOS path is relatively steady. Using this assumption, multiple channel estimates can be accumulated in block 604 allowing for the delay of the LOS peak to build up and be more easily distinguished from noise.

$$\hat{h}_{final}(k) = \hat{h}_s(k) + \lambda \hat{h}_s(k-1),$$
$$\text{where } 0 < \lambda < 1 \quad \text{Equation 15—Fading peak accumulation}$$

The forgetting factor λ for the accumulations magnifies the strength of the most recent channel estimates. The forgetting factor is tuned with the expected max rate of change of the line of sight path.

At block 618, the channel estimation algorithm 114 then identifies the peaks with highest magnitude from $\hat{h}_{final}(k)$. These peaks 618 translate to channel delays/path ranges 620 and can be introduced into the range and velocity estimator algorithm 112 as a new set of range measurements.

The range measurements produced by the channel estimation algorithm 114 have a distinguishing attribute when compared to those produced by the measurement algorithm 108. The channel estimation algorithm 114 is able to identify and distinguish paths without the need for frequency separation due to Doppler, therefore, the channel estimation algorithm 114 can be used when no relative motion is present between the transmitting and receiving ranging devices.

In summary, methods for: (1) extracting Doppler/velocity measurements; (2) estimating relative clock bias errors; (3) determining range and velocity estimates with associated confidences; and (4) extracting range estimates using channel estimation have been described. These methods can be used separately or combined to improve positioning solutions obtained by positioning systems used in indoor locations and other GPS-denied environments. For example, these methods can be used for location and positioning in first responder, military, and civilian applications.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method performed by a ranging device having one or more processors executing instructions stored in data storage, the method comprising:
nulling known frequencies with unwanted energy by a beamformer to isolate a single path;
measuring by a ranging device at least one of range or velocity measurements over time relative to one or more other ranging devices, wherein the at least one of range or velocity measurements are based on samples received from the single path, from a radio frequency based wireless communication system;
generating multiple potential range, velocity, and acceleration estimates based on the received measurements using a number of Kalman filter predictions, wherein each range is based on one of a plurality of isolated paths;
determining probabilities of the estimates using a probability density function;
testing estimates based on their weight according to the determined probabilities, and on decaying importance history according to a prior length of time between valid measurements;
discarding estimates that fail to meet a threshold as a result of the testing;
clustering potential solutions for a position of the ranging device based on a density of non-discarded estimates;
associating a confidence value to the potential solutions based on the weight and determined probabilities of the estimates;
initializing a position solution of the ranging device using a last known position of the ranging device; and
determining the position of the ranging device based on the confidence value of the potential solutions and the position solution as initialized to improve the position solution using peer-to-peer ranging signals received from the one or more other ranging devices.

2. The method of claim 1, further comprising clustering the measurements prior to generating the estimates.

3. The method of claim 1, further comprising receiving external probability information associated with the measurements.

4. The method of claim 3, wherein the external probability information includes at least one of relative power, absolute power, signal to noise ratio, and navigation filter range and relative velocity estimates.

5. The method of claim 1, wherein the velocity measurements are Doppler derived velocity measurements.

6. The method of claim 5, wherein the Doppler-derived velocity measurements are obtained using a minimum variance distortionless response spectrum estimator algorithm.

7. The method of claim 5, wherein the Doppler-derived velocity measurements are corrected using a clock bias removal algorithm.

8. The method of claim 7, wherein the clock bias removal algorithm uses spectrum exchanges, a modified aliased correlation, and Kalman filtering state estimation.

9. The method of claim 1, wherein a time of arrival estimator is at least one of an Early/Late, Early Slope, Early Zero Crossing, and High Resolution interpolator.

10. A method for generating range and velocity measurements for use in a positioning system, the method performed by one or more processors executing instructions stored in data storage, the method comprising:
receiving samples of radio frequency signals by a ranging device from a radio frequency based wireless communication system, wherein the samples of radio frequency signals are relative to one or more other ranging devices;
nulling known frequencies with unwanted energy by a beamformer to isolate a single path;
correlating the samples against a known pattern to produce a correlation surface;
generating a spectral estimate from the correlation surface using a minimum variance distortionless response algorithm;
generating a velocity measurement from the isolated path;
using a time of arrival estimator to generate a range measurement from the isolated path;
initializing a position solution of a ranging device using a last known position of the ranging device; and
determining a position of a ranging device based on the range measurement and the position solution as initialized to improve the position solution using peer-to-peer ranging signals received from the one or more other ranging devices.

11. The method of claim 10, further comprising estimating clock bias and removing a frequency error component of the clock bias prior to generating the velocity measurement.

12. The method of claim 11, wherein estimating clock bias includes performing an alias-aware cross correlation to match data from a first spectral estimate to a second spectral estimate.

13. The method of claim 11, wherein estimating clock bias includes creating different potential clock bias frequencies.

14. The method of claim 13, wherein estimating clock bias includes selecting one of the potential clock bias frequencies with a Kalman filter.

15. The method of claim 10, wherein selecting paths likely to be a line of sight path includes using external information.

16. A method for extracting range measurements using channel estimation, the method performed by one or more processors executing instructions stored in data storage, the method comprising:
nulling known frequencies with unwanted energy by a beamformer to isolate a single path;
receiving samples by a ranging device from a radio frequency based wireless communication system, wherein the samples of radio frequency signals are relative to one or more other ranging devices;
estimating a radio frequency channel from the received samples using a least squares solver;
generating a sparse channel estimate based on highest magnitude peaks obtained in the radio frequency channel estimate;
applying a decaying accumulator to the sparse channel estimate over time to distinguish a line of sight peak from the highest magnitude peaks;

converting the line of sight peak to an improved range measurement, wherein the improved range measurement is based on one of a plurality of isolated paths;

initializing a position solution of a ranging device using a last known position of the ranging device; and determining a position of the ranging device based on the improved range measurement and the position solution as initialized to improve the position solution using peer-to-peer ranging signals received from the one or more other ranging devices.

17. The method of claim 16, wherein estimating the radio frequency channel includes using a minimum mean square error solver with adaptive channel parameter updates.

18. The method of claim 16, wherein the improved range measurement is input to a range and velocity estimator algorithm.

\* \* \* \* \*